(12) United States Patent
Ho (10) Patent No.: US 11,932,484 B2
(45) Date of Patent: Mar. 19, 2024

(54) CONTAINER FOR STORING LIQUIDS AND MANUFACTURING METHOD THEREOF

(71) Applicant: Chien-Chih Ho, Taichung (TW)

(72) Inventor: Chien-Chih Ho, Taichung (TW)

( * ) Notice: Subject to any disclaimer, the term of this patent is extended or adjusted under 35 U.S.C. 154(b) by 554 days.

(21) Appl. No.: 17/200,878

(22) Filed: Mar. 14, 2021

(65) Prior Publication Data

US 2021/0316942 A1   Oct. 14, 2021

(30) Foreign Application Priority Data

Apr. 14, 2020   (TW) ................... 109112461

(51) Int. Cl.
| | | |
|---|---|---|
| *B65D 90/507* | (2019.01) | |
| *B29C 70/02* | (2006.01) | |
| *B65D 90/02* | (2019.01) | |
| *B65D 90/503* | (2019.01) | |
| *B65D 90/51* | (2019.01) | |
| *G01M 3/18* | (2006.01) | |
| *B29L 31/00* | (2006.01) | |

(52) U.S. Cl.
CPC .......... *B65D 90/507* (2019.02); *B29C 70/023* (2013.01); *B65D 90/028* (2013.01); *B65D 90/503* (2013.01); *B65D 90/51* (2019.02); *G01M 3/186* (2013.01); *B29L 2031/7154* (2013.01); *B65D 2203/12* (2013.01); *B65D 2590/0083* (2013.01); *B65D 2590/02* (2013.01)

(58) Field of Classification Search
CPC .... B65D 90/507; B65D 90/51; B65D 90/028; B65D 90/503; B65D 2203/12; B65D 2590/0083; B65D 2590/02; B65D 90/501; B65D 90/00; B65D 90/48; B65D 90/50; B65D 85/84; B65D 85/00; B65D 85/70; B29C 70/023; G01M 3/186; B29L 2031/7154; G01N 33/225; G01N 33/00; G01N 33/22; G01N 1/38; G01D 21/02; G01F 1/00

See application file for complete search history.

(56) References Cited

U.S. PATENT DOCUMENTS

| | | | |
|---|---|---|---|
| 4,739,659 A | 4/1988 | Sharp | |
| 5,054,645 A | 10/1991 | Sharp | |
| 5,829,625 A * | 11/1998 | Imagawa | ............. B65D 90/501 220/62.19 |
| 2023/0312232 A1* | 10/2023 | Brigham | ............. B65D 90/028 29/455.1 |

FOREIGN PATENT DOCUMENTS

EP              683113 A1 *  11/1995  ........... B65D 90/501

* cited by examiner

*Primary Examiner* — Brian A Zimmerman
*Assistant Examiner* — Anthony D Afrifa-Kyei
(74) *Attorney, Agent, or Firm* — Cheng-Ju Chiang (57) ABSTRACT

A container for storing liquids includes an inner layer including a storage space for storing liquids; an outer layer; and multiple spacers fastened between the inner layer and the outer layer to form multiple compartments. The spacer includes a first surface and a second surface. The first surface is secured to an adhesive layer of the inner layer. The first surface has many cavities. The second surface is secured to the outer layer and having projections complimentarily secured to the cavities. A manufacturing method of the container is also provided. Therefore, it can solve the problem permeation and adhesive failure caused by leaking. It can generate an early alarm by detecting any leaking or permeation of the container.

8 Claims, 9 Drawing Sheets

CONTAINER FOR STORING LIQUIDS AND MANUFACTURING METHOD THEREOF

BACKGROUND OF THE INVENTION

1. Field of the Invention

The invention relates to containers for storing liquids and more particularly to a container for storing liquids and a manufacturing method thereof without leaking, permeation, and adhesive failure. Also, it is capable of generating an early alarm by detecting any leaking or permeation of the container.

2. Description of Related Art

Conventionally, a container is used to store liquids (e.g., ammonia, hydrogen peroxide, sulfuric acid, hydrochloric acid, nitric acid, hydrofluoric acid, etc.) and usually has a double enclosure design.

Figure 9:
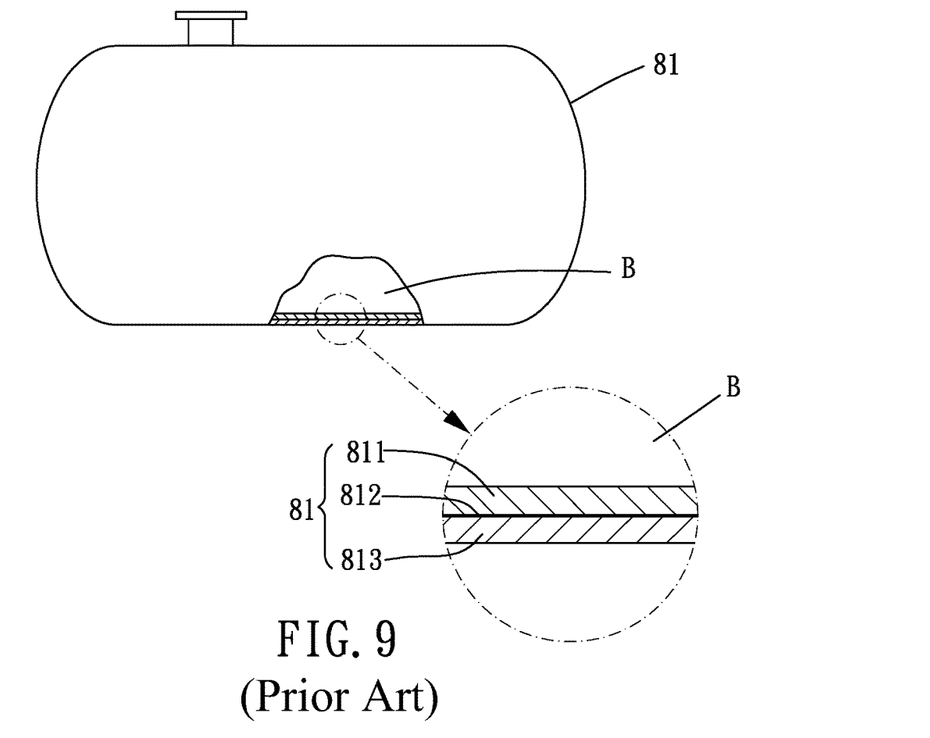
FIG. 9 is a side elevation in part section of a conventional container for storing liquids.

A conventional container 81 for storing liquids is shown in FIG. 9 and includes an inner enclosure 811 made of corrosion resistant plastic, an outer enclosure 813 made of metal or non-metal for structural enhancement, and an adhesive layer 812 for adhering the inner enclosure 811 to the outer enclosure 813. A storage space B is defined by the inner enclosure 811 for storing liquids. However, liquids may leak through cracks (not shown) in the inner enclosure 811 to contact with the thin adhesive layer 812 and further contact with the outer enclosure 813. Alternatively, the liquids may flow to the thin adhesive layer 812 and further to the outer enclosure 813 due to permeation.

Figure 10:
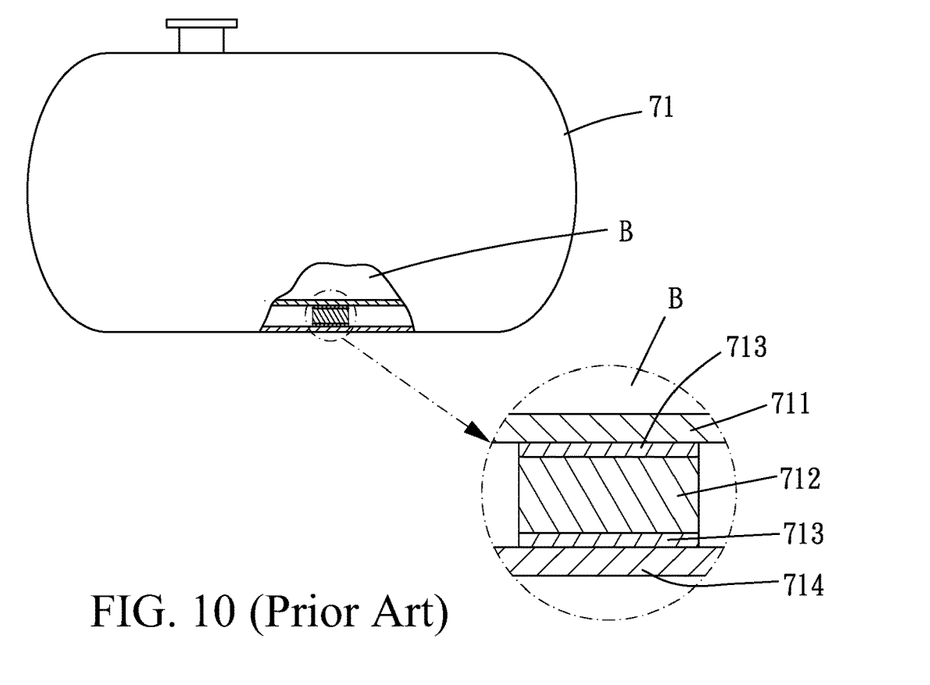
FIG. 10 is a side elevation in part section of another conventional container for storing liquids.

Another conventional container 71 for storing liquids is shown in FIG. 10 and includes an inner enclosure 711, an outer enclosure 714, a plurality of spacers 712 between and spaced apart from the inner enclosure 711 and the outer enclosure 714, and two adhesive layers 713 in which one adhesive layer 713 is used to adhere the inner enclosure 711 to the spacers 712 and the other adhesive layer 713 is used to adhere the outer enclosure 714 to the spacers 712. A storage space B is defined by the inner enclosure 711 for storing liquids. However, liquids may leak through cracks (not shown) into the space between the space between the inner enclosure 711 and the outer enclosure 714.

A couple of problems are experienced by both the conventional containers and are discussed below.

Regarding leaking, permeation, and adhesive failure problems, the leaked liquids may corrode the outer enclosure and eventually pass through the outer enclosure to pollute the environment and/or to cause industrial safety problem. Further, the leaked liquids may react with the adhesive layer to generate gas/object to damage the inner and outer enclosures. Moreover, the reacted object caused by the leaked liquids is possible to flow back into the storage space and then to pollute the stored liquids (causing the entire stored liquids impure, contaminated or chemically deteriorated). For non-corrosive liquids being stored, the leaking and/or permeation may cause the adhesive layers aging or deteriorated quickly. As a result, the adhesive layers fail (such as unglued, separated, blistering problem, etc.).

There is no alarm in the initial phase of the leaking or the permeation. Thus, it is impossible of generating an early alarm by detecting any leaking or permeation of the container.

Thus, the need for improvement still exists.

SUMMARY OF THE INVENTION

The invention has been made in an effort to solve the problems of the conventional art including leaking, permeation, adhesive failure, and no early alarm of the leaking or the permeation by providing a container for storing liquids and manufacturing method thereof having novel and non-obvious characteristics.

To achieve above and other objects of the invention, the invention provides a container for storing liquids comprising an inner layer including a storage space for storing liquids; an outer layer; and at least one spacer fastened between the inner layer and the outer layer to form a plurality of compartments, the spacer including a first surface secured to an adhesive layer of the inner layer, the first surface having a plurality of cavities, and a second surface secured to the outer layer and having a plurality of projections complimentarily secured to the cavities; a safety device including an alarm device, at least one pipe connected to one of the compartments, at least one fluid sucking device connected to the pipe, the fluid sucking device being configured to keep pressure in the pipe lower than 760 Torr, and at least one sensor having a preset warning value, wherein said sensor is attached to the pipe and disposed between the compartment and the fluid sucking device, said sensor is configured to sense concentration, pressure, electrical conductivity or pH value of the liquids in the compartments and compare same with the preset warning value, and in response to the comparison being positive, each sensor is configured to transmit a signal representing a warning to the alarm device so that the alarm device is configured to generate an alarm.

The invention further provides a method for manufacturing a container for storing liquids, comprising the steps of preparing, pressurizing and heating, cooling, and finishing.

The above and other objects, features and advantages of the invention will become apparent from the following detailed description taken with the accompanying drawings.

DETAILED DESCRIPTION OF THE INVENTION

Referring to FIGS. 1A, 1B, 2, 3A, 3B and 3C, this invention relates to container for storing liquids and its manufacturing method.

Figure 1A:
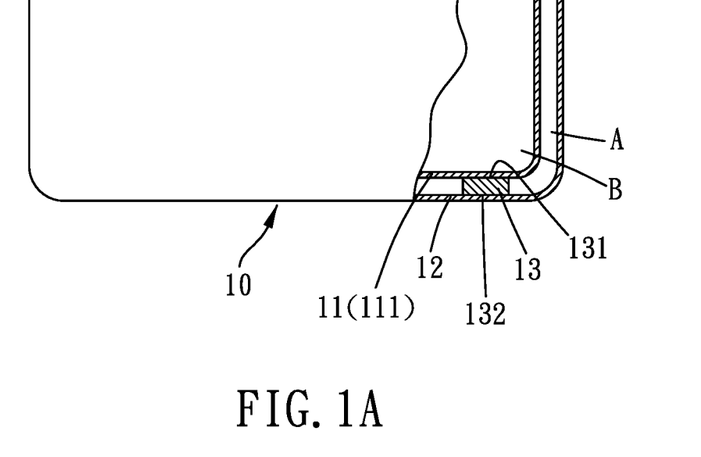
FIG. 1A is a side elevation in part section of a container for storing liquids according to a first preferred embodiment of the invention.
Figure 1B:
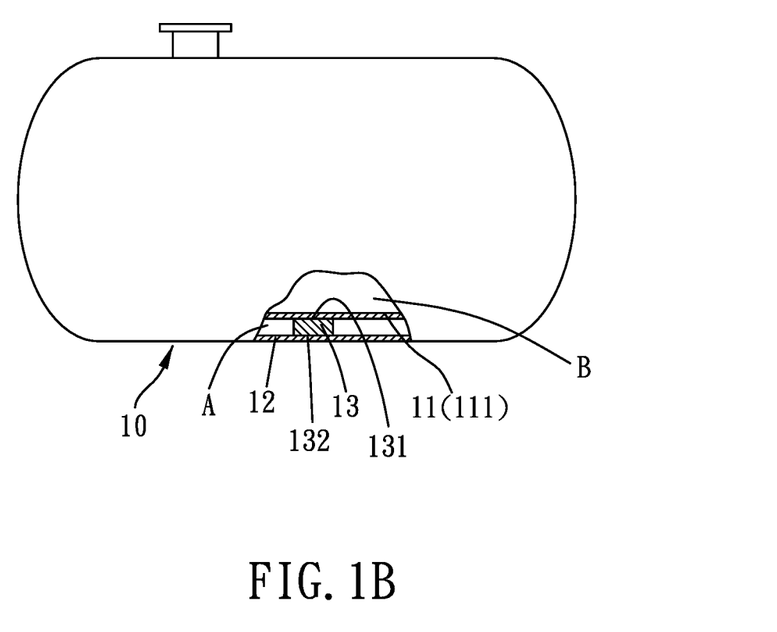
FIG. 1B is a side elevation in part section of a container for storing liquids according to a second preferred embodiment of the invention.

About the container 10, it is provided for storing liquids (can be an opened typed container which is a first preferred embodiment shown in FIG. 1A; or a closed typed container which is a second preferred embodiment shown in FIG. 1B) of the invention. This container 10 includes an inner layer 11, an outer layer 12, and a plurality of spacers 13 (at least one is shown).

Figure 2:
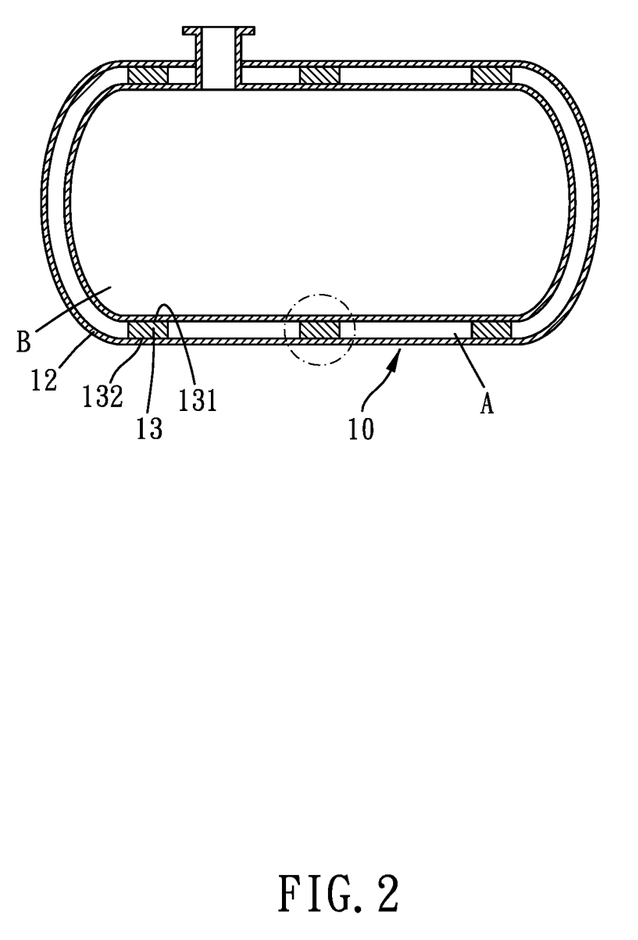
FIG. 2 is a longitudinal sectional view of FIG. 1B.

The spacers 13 are fastened (or secured) between the inner layer 11 and the outer layer 12 so as to form a plurality of compartments A between them. A storage space B is defined by the inner layer 11 for storing liquids. Each spacer 13 includes a first surface 131 secured to an adhesive layer 111 of the inner layer 11, and a second surface 132 secured to the outer layer 12.

Figure 3A:
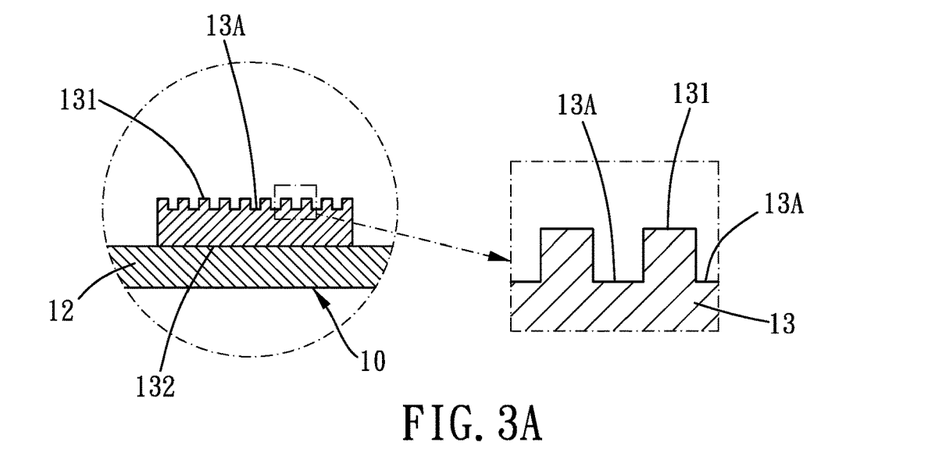
FIGS. 3A, 3B and 3C are longitudinal sectional views showing manufacturing processes of the container components of the invention.
Figure 3B:
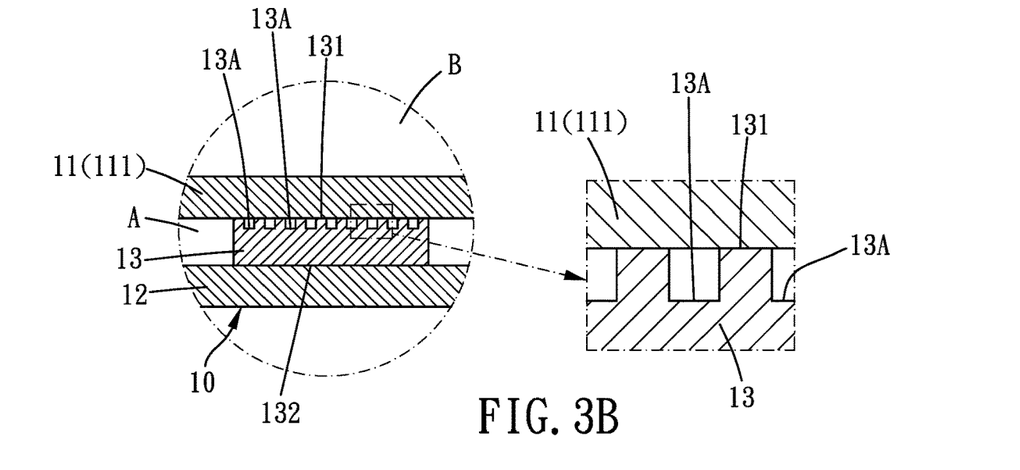
Figure 3C:
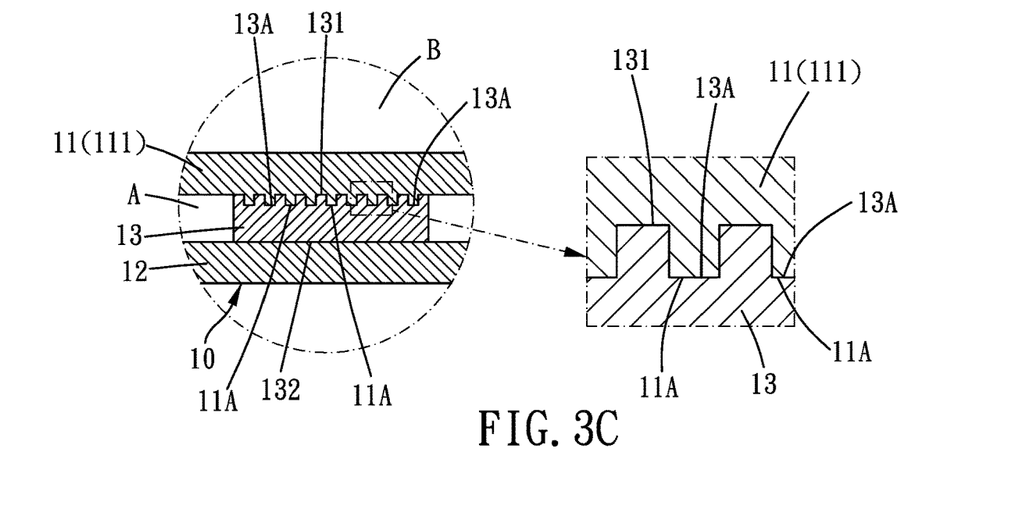

Referring to FIGS. 3A to 3C, three manufacturing processes the above container components are illustrated. The first surface 131 includes a plurality of cavities 13A (or recesses). The inner layer 11 includes the adhesive layer 111 having a plurality of projections 11A complimentarily secured to the cavities 13A.

The adhesive layer 111 is made of fluorine-containing thermoplastic such as perfluoroalkoxy alkanes (PFA), fluorinated ethylene propylene (FEP), polyvinylidene difluoride (PVDF), polytetrafluoroethene (PTFE), or ethylene-chloro-trifluoroethylene copolymer (ECTFE).

The outer layer 12 is made of metal or fiber reinforced plastics (FRP).

The spacer 13 is made of metal or non-metal.

The outer layer 12 and the spacer 13 are fastened together by welding or other securing method to form an integral structure.

Figure 4A:
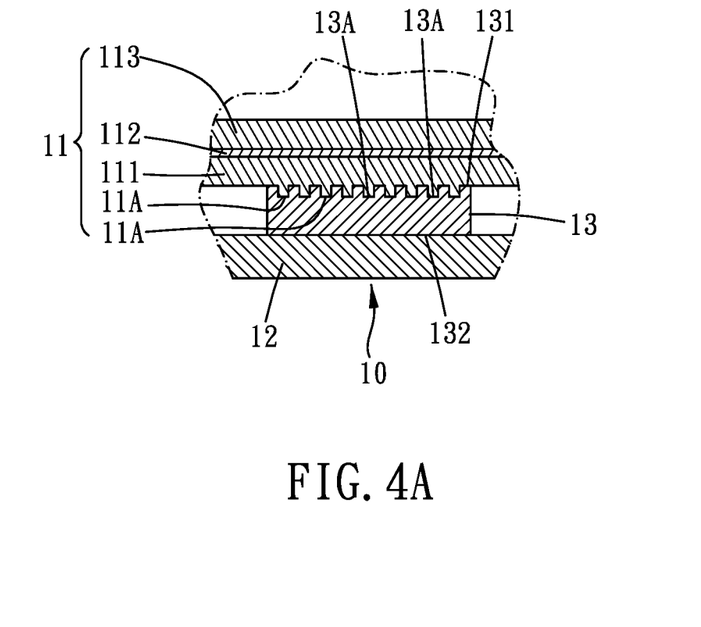
FIG. 4A is a longitudinal sectional view showing a portion of a container for storing liquids according to a third preferred embodiment of the invention.

Referring to FIG. 4A, it is a longitudinal sectional view showing a portion of a container for storing liquids according to a third preferred embodiment of the invention. The inner layer 11 further comprises an enhancement layer 112 formed on an inner surface of the adhesive layer 111, and a working layer 113 formed on an inner surface of the enhancement layer 112. That is, the enhancement layer 112 is disposed between the adhesive layer 111 and the working layer 113.

Figure 4B:
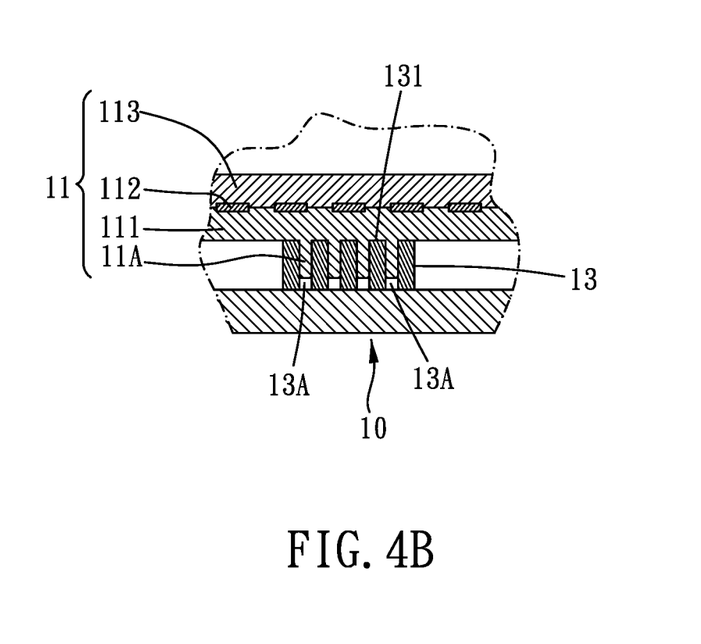
FIG. 4B is a longitudinal sectional view showing a portion of a container for storing liquids according to a fourth preferred embodiment of the invention.

The enhancement layer 112 is implemented as a metal mesh, a non-metal mesh, or a porous member (as shown in FIG. 4B which is a fourth preferred embodiment of the invention). The plurality of cavities 13A are replaced with through holes (as shown in FIG. 4B).

The working layer 113 is made of fluorine-containing thermoplastic such as PFA, FEP, PVDF, PTFE, or ECTFE.

Figure 5:
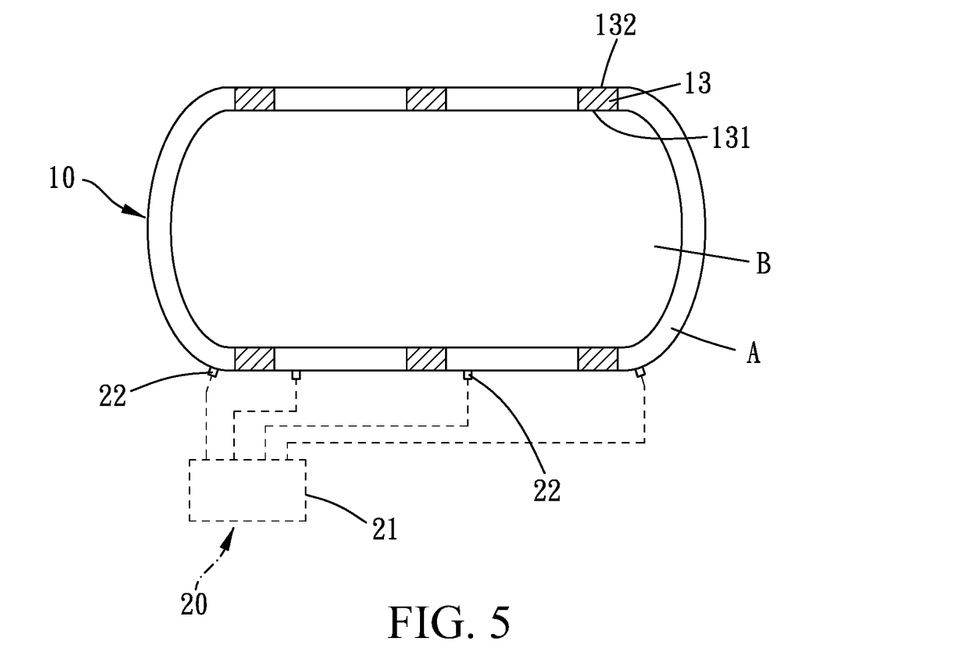
FIG. 5 is a longitudinal sectional view showing a portion of a container for storing liquids showing a first embodiment of the safety device of the invention.
Figure 6A:
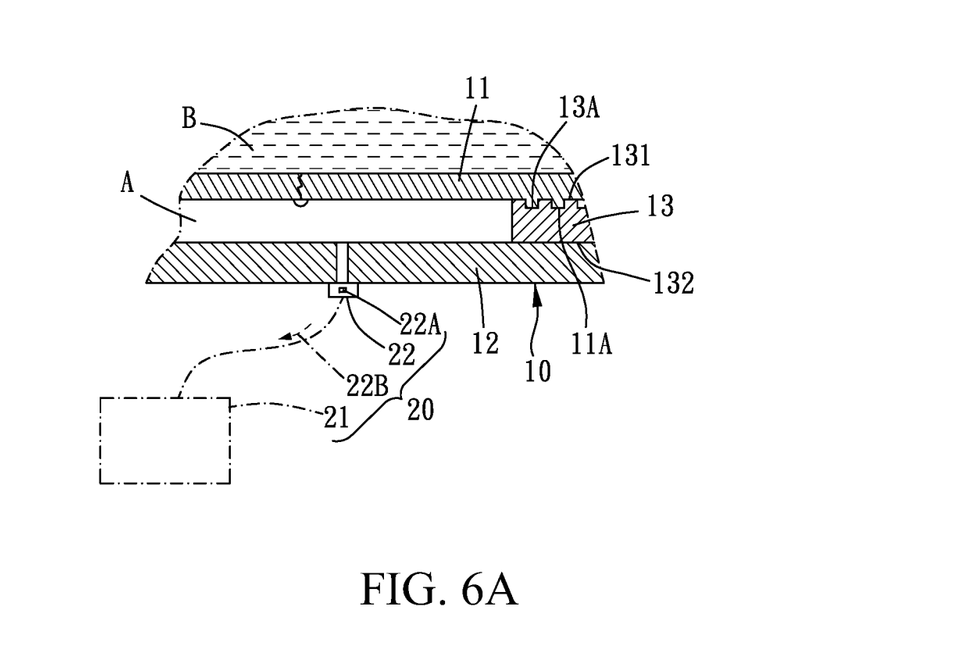
FIG. 6A is an enlarged view of a portion of FIG. 5 showing details of the safety device.

Referring to FIGS. 5 and 6A, the container 10 for storing liquids includes a safety device 20.

In a first embodiment of the safety device 20, it includes an alarm device 21 and a plurality of sensors 22 having a preset warning value 22A. Each sensor 22 is attached to the corresponding compartment A and is electrically connected to the alarm device 21. The sensor 22 is capable of sensing an approaching danger (e.g., leaking) of the compartment A and notifying same to the alarm device 21.

In detail, the sensor 22 is used to sense and determine whether concentration of a predetermined liquid (or gas) in the corresponding compartment A is greater than the preset warning value 22A. If yes, the sensor 22 sends a warning signal 22B to the alarm device 21 which in turn may generate an alarm about the danger.

Specifically, each compartment A is corresponding to a specific sensor 22. In case of alarm, it is possible of knowing which compartment A malfunctions. For example, in case of a leak in a specific compartment A, a preset audio alarm associated with the compartment A is generated by the alarm device 21. As a result, an early warning mechanism (or warning action) can be carried out.

Alternatively, the sensor 22 may be detected for the gaseous concentration of a predetermined object (e.g., sulfuric acid). This sensor 22 is capable of sensing and determining whether in the compartment A is greater than the preset warning value 22A. If yes (i.e., there is a leak), the sensor 22 sends a warning signal 22B to the alarm device 21 which in turn generates an alarm about the leak. So, the sensor 22 may sense any abnormal conditions of liquids or gas in the compartment A.

Figure 6B:
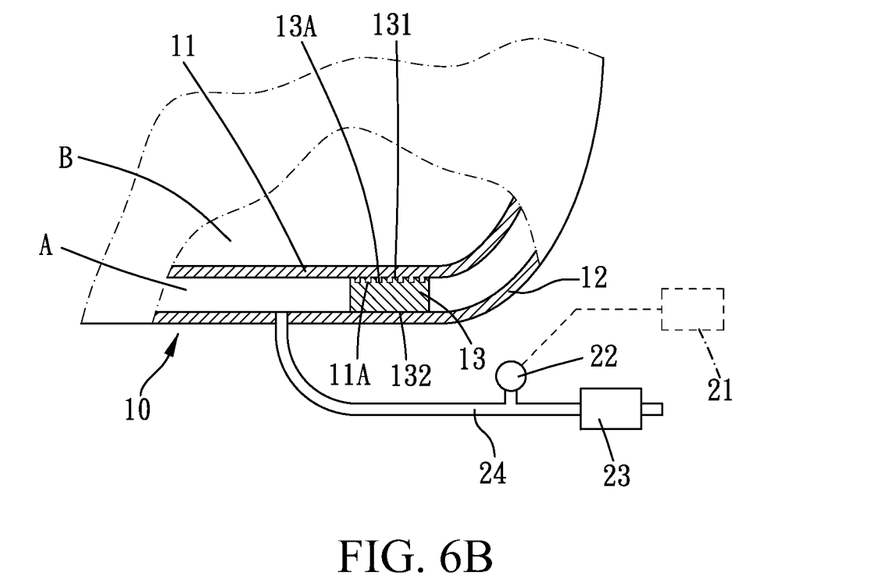
FIG. 6B is a view showing details of a second embodiment of the safety device.

Referring to FIG. 6B, it shows details of a second embodiment of the safety device 20. The characteristics of the second embodiment of the safety device 20 are substantially the same as that of the first embodiment of the safety device 20 except the following: there is further provided with at least one pipe 24 connected to one of the compartments A, and a fluid sucking device 23 (such as centrifugal fan, vacuum pump, or the like) connected to the pipe 24 (being in fluid communicating therewith). The fluid sucking device 23 is used to keep pressure in the pipe 24 lower than 760 Torr.

The sensor 22 is implemented as a pressure gauge (or the like) and connects with the pipe 24, i.e., disposed between the compartment A and the fluid sucking device 23. The sensor 22 is capable of measuring and determining whether the pressure in the compartment A is greater than the preset warning value 22A. If yes (i.e., there is a danger), the sensor 22 sends a warning signal 22B to the alarm device 21 which in turn generates an alarm (or alarming action) about the excessive pressure in the compartment A.

Figure 6C:
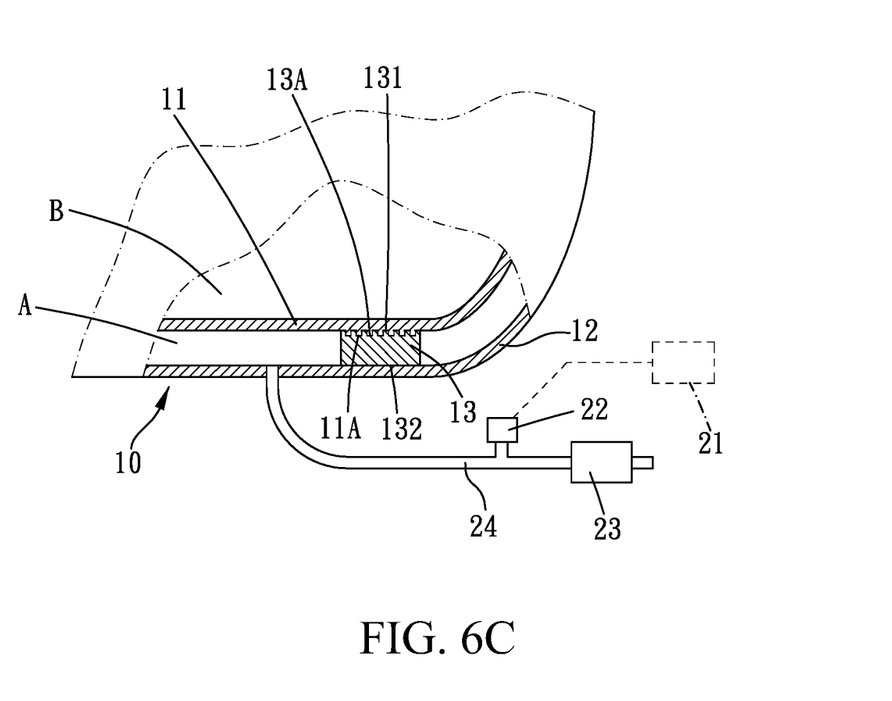
FIG. 6C is a view showing details of a third embodiment of the safety device.

Referring to FIG. 6C, it shows details of a third embodiment of the safety device 20. The characteristics of the second embodiment of the safety device 20 are substantially the same as that of the first embodiment of the safety device 20 except the following: the sensor 22 is implemented as a concentration meter (or the like) for measuring and determining whether the concentration (or electrical conductivity, pH value, etc.) of a predetermined object in the compartment A is greater than the preset warning value 22A. If yes (i.e., there is a danger), the sensor 22 sends a warning signal 22B to the alarm device 21 which in turn generates an alarm (or alarming action) about the excessive concentration of the object in the compartment A.

Specifically, if the pressure of the compartment A is kept at 380 Torr (after the gas in the compartment A has been sucked) and a leak occurs in the inner layer 11, the pressure in the compartment A will increase gradually. An alarm is generated if the pressure in the compartment A is higher than the preset warning value 22A (for example, assuming presetting at 456 Torr). Likewise, an alarm is generated if excessive concentration of the predetermined object in the compartment A is measured.

Figure 7:
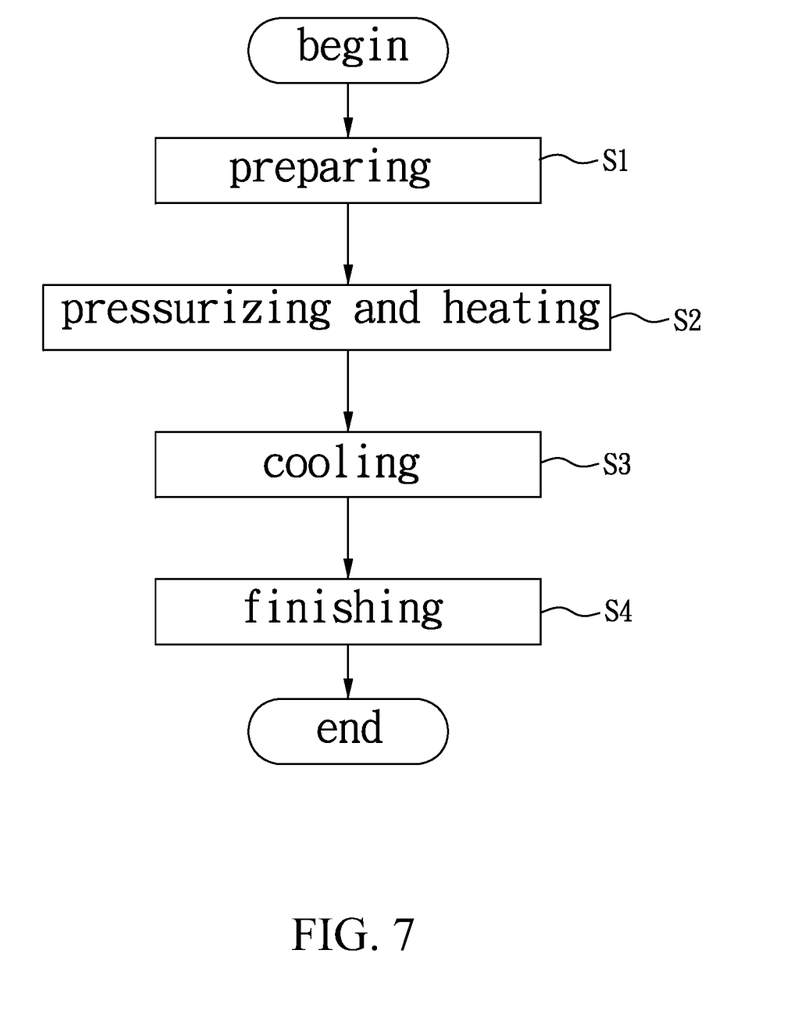
FIG. 7 is a flow chart of a method for manufacturing a container for storing liquids.

Referring to FIG. 7, a flow chart of a method for manufacturing a container for storing liquids. This method comprises the steps of:

S1: preparing in which a container 10 including an inner layer 11, an outer layer 12, and a plurality of spacers 13 between the inner layer 11 and the outer layer 12 for forming a plurality of compartments A. A storage space B is defined by the inner layer 11 for storing liquids. The spacer 13 includes a first surface 131 secured to an adhesive layer 111 of the inner layer 11, and a second surface 132 secured to the outer layer 12. The first surface 131 includes a plurality of cavities 13A. The inner layer 11 includes the adhesive layer 111 having a plurality of projections 11A complimentarily secured to the cavities 13A.

S2: pressurizing and heating in which heat and pressure are exerted on the adhesive layer 111 in a direction from the storage space B to the outer layer 12. The heat has a temperature higher than the melting point of the adhesive layer 111. Thus, the adhesive layer 111 is melted into the cavities 13A.

S3: cooling in which the portions of the adhesive layer 111 melted in the cavities 13A are cured as a plurality of projections 11A secured to the cavities 13A in a complementary manner.

S4: finishing in which a container for storing liquids is produced.

The adhesive layer 111 is made of fluorine-containing thermoplastic such as perfluoroalkoxy alkanes (PFA), fluorinated ethylene propylene (FEP), polyvinylidene difluoride (PVDF), polytetrafluoroethene (PTFE), or ethylene-chlorotrifluoroethylene copolymer (ECTFE).

The outer layer 12 is made of metal or fiber reinforced plastics (FRP).

The spacer 13 is made of metal or non-metal.

The outer layer 12 and the spacer 13 are fastened together by welding or other securing method to form an integral structure.

Referring to FIG. 4A, the inner layer 11 may further comprise an enhancement layer 112 formed on an inner surface of the adhesive layer 111, and a working layer 113 formed on an inner surface of the enhancement layer 112. That is, the enhancement layer 112 is disposed between the adhesive layer 111 and the working layer 113.

The enhancement layer 112 is implemented as a metal mesh, a non-metal mesh, or a porous member (as shown in FIG. 4B which is a fourth preferred embodiment of the invention). The plurality of cavities 13A are replaced with through holes (as shown in FIG. 4B).

The working layer 113 is made of fluorine-containing thermoplastic such as PFA, FEP, PVDF, PTFE, or ECTFE.

Of course, after step S1, a safety device 20 can be provided and connected to the container 10. The detailed structure and function about the inner layer 11 and the safety device 20 are already described above, so there is no need to repeat here.

About this invention, because the heat and pressure are exerted on the adhesive layer 111 in a direction from the storage space B to the outer layer 12. The heat has a temperature higher than the melting point of the adhesive layer 111. Thus, the adhesive layer 111 is melted into the cavities 13A. After which, the portions of the adhesive layer 111 melted in the cavities 13A are cured as a plurality of projections 11A secured to the cavities 13A in a complementary manner. Therefore, it significantly improves the bonding strength between the inner layer 11 and the spacer 13. No adhesive is used and thus the problem of molten adhesive passing through the inner layer 11 to contaminate the liquids in the storage space B is solved.

Figure 8:
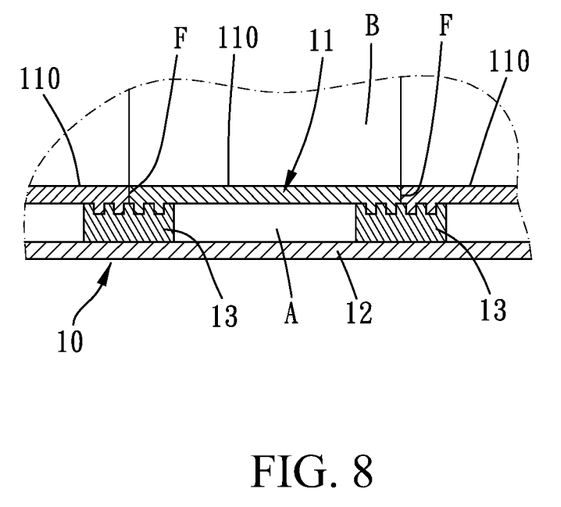
FIG. 8 is a longitudinal sectional view showing a portion of a container for storing liquids illustrating another preferred embodiment of the invention.

Besides, referring to FIG. 8, it is an application of this invention on a larger container. Under this condition, the inner layer 11 includes a plurality of structural units 110 in which any two adjacent structural units 110 are joined at an interface F by welding, soldering or other known bonding method. The interface F is positioned on the corresponding spacer 13.

It is understood that leak tends to occur at the interface F. In this invention, the interface F is just positioned on the spacer 13. In case the leak occurs at the interface F, the leaked liquids are substantially blocked by the firmly bonded projections 11A and cavities 13A. It will not leak. In addition, no adhesive layer is used in the invention. Thus, this invention does not have problems including adhesive failure or contamination problem in the conventional containers.

Of course, the outer layer 12, the spacer 13, and the enhancement layer 112 can be made of metal or non-metal.

This invention has the following advantages and effects:

[1] It solve the leaking, permeation, contamination, and adhesive failure problems. The problem of molten adhesive passing through the inner layer to contaminate the liquids in the storage space B is solved because no adhesive is used. The adhesive layer has the plurality of projections which are complimentarily secured to the cavities by heating and cooling. This is a watertight connection. Thus, leaking permeation, contamination, or adhesive failure problem is substantially avoided.

[2] The alarm for leaking or permeation can increase the safety. By utilizing these sensors to determine whether concentration of a predetermined liquid (or gas) in the compartment is greater than the preset warning value. In case there is a leak in the compartment, a preset audio alarm associated with the compartment is generated by the alarm device. As a result, an early warning mechanism (or warning action) for such leaking or permeation can be carried out.

While the invention has been described in terms of preferred embodiments, those skilled in the art will recognize that the invention can be practiced with modifications within the spirit and scope of the appended claims.

What is claimed is:

1. A container for storing liquids comprising:
an inner layer including a storage space for storing liquids;
an outer layer; and
at least one spacer fastened between the inner layer and the outer layer to form a plurality of compartments, the spacer including a first surface secured to an adhesive layer of the inner layer, the first surface having a plurality of cavities, and a second surface secured to the outer layer; the adhesive layer having a plurality of projections complimentarily secured to the cavities;
a safety device including an alarm device, at least one pipe connected to one of the compartments, at least one fluid sucking device connected to the pipe, the fluid sucking device being configured to keep pressure in the pipe lower than 760 Torr, and at least one sensor having a preset warning value, wherein the at least one sensor is attached to the pipe and disposed between the compartment and the fluid sucking device, the at least one sensor is configured to sense concentration, pressure, electrical conductivity or pH value of an object in the compartments and compare same with the preset-warning value, and in response to the comparison being positive, each of the at least one sensor is configured to transmit a signal representing a warning to the alarm device so that the alarm device is configured to generate an alarm.

2. The container for storing liquids of claim 1, wherein:
the adhesive layer is made of fluorine-containing thermoplastic such as perfluoroalkoxy alkanes (PFA), fluorinated ethylene propylene (FEP), polyvinylidene difluoride (PVDF), polytetrafluoroethene (PTFE), or ethylene-chlorotrifluoroethylene copolymer (ECTFE);
the inner layer further comprises an enhancement layer and a working layer;
the enhancement layer is disposed between the adhesive layer and the working layer;
the enhancement layer is a metal mesh, a non-metal mesh, or a porous member;
the cavities are through holes; and
the working layer is made of fluorine-containing thermoplastic such as PFA, FEP, PVDF, PTFE, or ECTFE.

3. The container for storing liquids of claim 2, wherein the inner layer includes a plurality of structural units, wherein any two adjacent structural units are joined at an interface; and wherein the interface is positioned on the spacer.

4. A method for manufacturing a container for storing liquids, comprising the steps of:
(a) preparing a container including an inner layer including a storage space for storing liquids; an outer layer; and at least one spacer fastened between the inner layer and the outer layer to form a plurality of compartments, the spacer including a first surface secured to an adhesive layer of the inner layer, the first surface having a plurality of cavities, and a second surface secured to the outer layer; wherein the container further comprises a safety device, wherein the safety device includes an alarm device, at least one pipe connected to one of the compartments, at least one fluid sucking device connected to the pipe, the fluid sucking device being configured to keep pressure in the pipe lower than 760 Torr, and at least one sensor having a preset warning value, and wherein the at least one sensor is attached to the pipe and disposed between the compartment and the fluid sucking device, each of the at least one sensor is configured to sense concentration, pressure, electrical conductivity or pH value of the liquids in the compartments and compare same with the preset warning value, and in response to the comparison being positive, the each of the at least one sensor is configured to transmit a signal representing a warning to the alarm device so that the alarm device is configured to generate an alarm;

(b) pressurizing and heating wherein heat and pressure are exerted on the adhesive layer in a direction from the storage space to the outer layer, the adhesive layer is melted into the cavities;
(c) cooling wherein the portions of the adhesive layer melted in the cavities are cured as a plurality of projections formed on the adhesive layer and complementarily secured to the cavities; and
(d) finishing the container.

5. The method of claim 4, wherein:
the adhesive layer is made of fluorine-containing thermoplastic such as perfluoroalkoxy alkanes (PFA), fluorinated ethylene propylene (FEP), polyvinylidene difluoride (PVDF), polytetrafluoroethene (PTFE), or ethylene-chlorotrifluoroethylene copolymer (ECTFE);
the inner layer further comprises an enhancement layer and a working layer;
the enhancement layer is disposed between the adhesive layer and the working layer;
the enhancement layer is a metal mesh, a non-metal mesh, or a porous member;
the cavities are through holes; and
the working layer is made of fluorine-containing thermoplastic such as PFA, FEP, PVDF, PTFE, or ECTFE.

6. The method of claim 5, wherein the inner layer includes a plurality of structural units, wherein any two adjacent structural units are joined at an interface; and wherein the interface is positioned on the spacer.

7. The method of claim 4, wherein:
the adhesive layer is made of fluorine-containing thermoplastic such as perfluoroalkoxy alkanes (PFA), fluorinated ethylene propylene (FEP), polyvinylidene difluoride (PVDF), polytetrafluoroethene (PTFE), or ethylene-chlorotrifluoroethylene copolymer (ECTFE);
the inner layer further comprises an enhancement layer and a working layer;
the enhancement layer is disposed between the adhesive layer and the working layer;
the enhancement layer is a metal mesh, a non-metal mesh, or a porous member;
the cavities are through holes; and
the working layer is made of fluorine-containing thermoplastic such as PFA, FEP, PVDF, PTFE, or ECTFE.

8. The method of claim 7, wherein the inner layer includes a plurality of structural units, wherein any two adjacent structural units are joined at an interface; and wherein the interface is positioned on the spacer.

* * * * *